Oct. 30, 1962 J. C. VAN HOUTEN 3,060,516
METHOD OF MOULDING OBJECTS FROM THERMOPLASTIC
SYNTHETIC MATERIAL
Filed March 21, 1960 2 Sheets-Sheet 2

INVENTOR
JAN CHRISTOFFEL
VAN HOUTEN
BY
AGENT

# United States Patent Office 3,060,516
Patented Oct. 30, 1962

3,060,516
METHOD OF MOULDING OBJECTS FROM THERMOPLASTIC SYNTHETIC MATERIAL
Jan Christoffel van Houten, Baarn, Netherlands, assignor to North American Philips Company, Inc., New York, N.Y., a corporation of Delaware
Filed Mar. 21, 1960, Ser. No. 16,289
Claims priority, application Netherlands Apr. 9, 1959
6 Claims. (Cl. 18—48.3)

This invention relates to methods of moulding objects from thermoplastic synthetic material, more particularly gramophone records from a copolymer of vinyl chloride and vinyl acetate. In manufacturing gramophone records, it is known to bring the synthetic material, which may already be pre-heated, into a press mould with matrices which was subsequently placed between two heated pressing blocks. As soon as the record was formed and the moulding material thus had completely filled the mould and had been pressed for a small proportion beyond the mould, the pressing blocks were cooled, so that the moulding material was likewise cooled until the record had sufficiently hardened. This was a very uneconomical method, since disproportionally much heat was lost. Consequently, it has previously been suggested to utilize two sets of pressing blocks, one set of which was continuously heated, whereas the other set was permanently cooled. The press mould, which had a comparatively low heat-capacity, together with the moulding material, which may have been pre-heated, was first placed between the heated pressing blocks, whereupon after filling of the mould, the latter was removed in the closed state from between the heated pressing blocks and then placed between the cooled blocks. This method already yielded a considerable saving in heat, but was time-consuming and, in addition, the phase without pressure in certain cases involved a disadvantage which had to be suppressed by special steps. An object of the invention is to obtain at least the same saving in heat whilst, in addition, the whole process may be considerably accelerated and the moulding structure may be much simpler, whilst the quality of the product and more particularly of the gramophone record becomes better than was possible with the known technique.

A method according to the invention is characterized in that the material to be moulded and previously proportioned and formed in the shape of a disc having a considerably smaller size, but a greater thickness than the finished product is rapidly pre-heated outside the mould up to a temperature such that the module of elasticity is substantially zero and the viscosity attains so low a value that, during the first phase of the moulding process, substantially no pressure is built up in the material, the preheating being effected so rapidly that dissociation of the material does not occur, whereupon the material is introduced into a press mould, likewise pre-heated, which is subsequently placed in a press between two pressing blocks which are continuously cooled, whereupon the press is closed and maintained closed until the material and the press mould have a temperature approximately equal to that of the cooled pressing blocks. According to the invention, one thus benefit from the pre-heating, which in most cases is already used, for bringing the material into a state such that, during the filling of the mould, pressure is substantially not built up in the material, the mould being filled as it were in a flowing way. Further heating is then not necessary and the cooling process may take place immediately.

In one embodiment of the method according to the invention, the press mould is pre-heated to a temperature higher than that of the synthetic material. Any thermal losses between the introduction of the synthetic material into the press mould and the introduction of the latter into the press are thus neutralized, but much more important are other advantages which are obtained and which will be explained in detail hereinafter. It is then possible inter alia to obtain sufficient and rapid relaxation for the synthetic material.

In a further embodiment of the method according to the invention, the press mould is preferably pre-heated to an extent such that the temperature of the mould, which is already cooling, at the moment when, with the press closed, the mould has already been completely filled by the substance and the pressure in the substance has reached its ultimate value, is still so much higher than the temperature of the material that at the moment when the mould and the substance have the same temperature, the material has adapted itself substantially free from strain to the shape then obtained. The advantages of this embodiment will also be explained in detail hereinafter.

In order that the invention may be readily carried into effect, it will now be described in detail, by way of example, with reference to the accompanying drawings showing in two graphs the variation in temperature and pressure in pressing gramophone records by a known method and by the method according to the invention, together with one embodiment of a device which can be used in the method according to the invention, that is to say:

Figure 1:
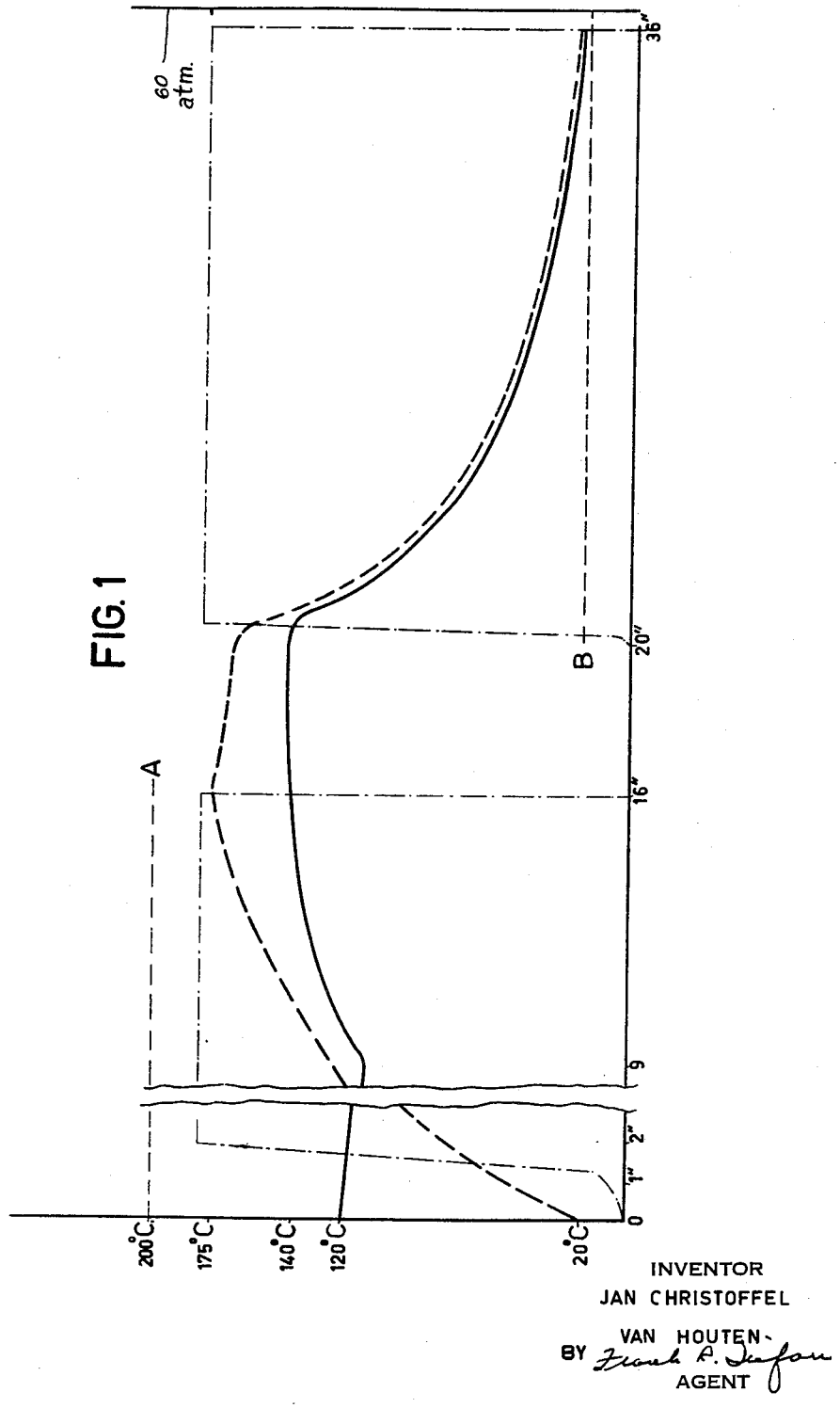
FIG. 1 shows a graph of the variation in temperature and pressure, plotted against time, of the moulding material and the press mould according to a known method.

FIG. 1 shows on the axis of abscissae a time scale from 0 to 36 secs. and on the axis of ordinates a temperature scale from 0 to 200° C. at the left and a pressure scale from 0 to 60 atms. at the right. The temperature of the moulding material, in this example a copolymer of vinyl chloride and vinyl acetate, is indicated by a full line, the temperature of the press mould by a dashed line and the pressure in the moulding material by a dot-and-dash line. The graph relates to the known method in which the substance is first pre-heated, then placed in the press mould between two hot pressing blocks and moulded, subsequently removed together with the mould from the press, whereafter the press mould with the material is placed between cooled pressing blocks and again pressed. From the graph it may be seen that the synthetic material is pre-heated to 120° C. After being brought between the heated pressing blocks, the temperature of the material decreases, whereas the temperature of the mould between the heated pressing blocks increases. The pressure in the material after about 2 seconds is brought to 60 atms. After 8 to 9 seconds, the temperature of the material again starts to increase and after 16 seconds has attained a value of about 140° C. The temperature of the mould is then much higher and is approximately 175° C. Now, the pressure is removed from the press and during the four seconds between 16 and 20 seconds, the mould together with the material is placed between the cooled pressing blocks. The pressure in the substance then again increases to 60 atms. and the temperatures of both the press mould and the material rapidly decrease until in 36 seconds, as reckoned from the beginning of the moulding process, both the record and the mould have attained a temperature of 20° C. whereafter the moulding process is terminated and the mould can be opened and the pressed record removed. A and B indicate the temperatures of 200° C. and 20° C., respectively, of the heated and cooled pressing blocks, respectively. It will be referred to raise the temperature of the moulding material before it is introduced into the mould, but this temperature cannot be increased in view of the two phases process, since otherwise gas is liable to evolve in the material during the time of change when no pressure prevails. In addition, this process has the disadvantage that the record relaxes free from pressure so that the groove is liable to be deformed during the second phase.

Figure 2:
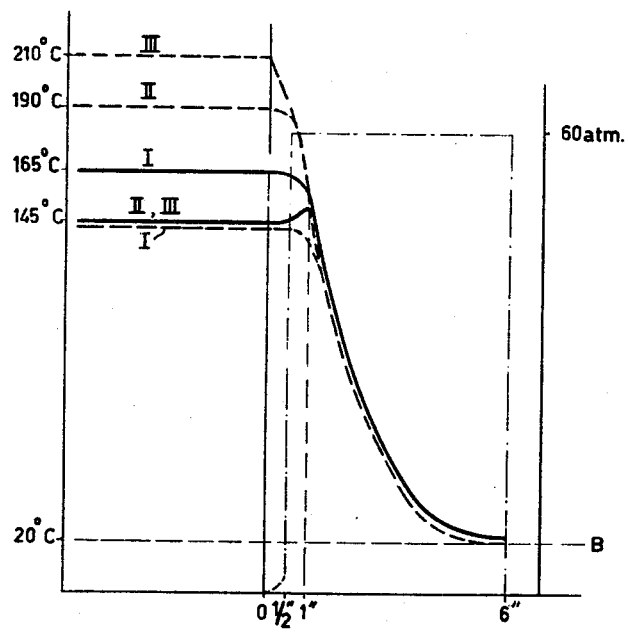
FIG. 2 shows a similar graph, but now according to an embodiment of the method according to the invention.

In FIG. 2, the temperatures and pressure are plotted again along the axis of abscissae and the axis of ordinates respectively. The beginning of the moulding process is indicated by O. Three curves in full line I, II and III are shown for the variation in temperature in the moulding material and three curves in dashed line I, II and III represent the corresponding temperatures in the press mould. After moulding for 1 second, all of the lines coincide. The line of 20° C. as indicated by B represents the temperature of the cooled pressing blocks. The pressure of 60 atms. is indicated by a dot-and-dash line.

Figure 3:
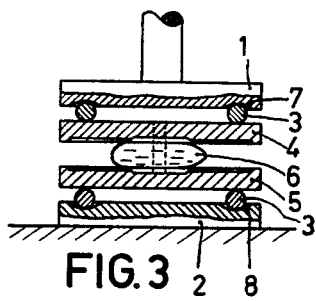
FIG. 3 is a sectional view of two cooled pressing blocks with resilient rings and the interposed press mould filled with moulding material.

In the curves I, the material is pre-heated to 165° C. and the mould is pre-heated to 145° C. When the mould and the material are then placed between the cooled pressing blocks, the temperature of the material slowly decreases and, after one second, reaches a temperature of about 155° C. At the same time, the temperature of the mould has also decreased to a somewhat lower value. However, during the first half second, pressure is not built up in the material owing to the high temperature of the material, at which it is plastic. In addition, as shown in FIG. 3, a resilient element 3, in this example silicon rubber, is provided between the pressing block cooled to 20° C. and the press mould 4. A similar element 3 is provided between pressing block 2 and press mould 5, the moulding material 6 being located between the two halves 4 and 5 of the mould. The cavities 7 and 8 are such that, when the pressure has been built up completely, the halves 4 and 5 of the mould engage the cooled pressing blocks 1 and 2. If, as appears from the graph, pressure is not built up in the material during the first half second, there is no intense cooling. After half a second, the substance has filled the mould completely and the latter is also closed. Now, pressure is built up in the material and, consequently, the resilient elements 3 are compressed so that the press mould and the pressing block engage each other and intense cooling occurs. After one second, the temperature of the mould and the material has decreased a little below 145° C. and now this temperature rapidly decreases to the cooling temperature of 20° C. In the first place, the total time during which the press is in use, is thus only 6 seconds. In the method shown in FIG. 1, the total time the press was in use for two records was 36 seconds, that is 18 seconds for each record. Besides, the material was already moulded while still being comparatively cold, which is not beneficial to the quality of the product and results in wear of the matrices. From FIG. 2 it also appears that during the second half second, after the beginning of the moulding process, the temperature of the material is still so high that during this half second, the relaxation time, the substance can fully relax and, owing to the high temperature, such relaxation can take place rapidly. The internal stresses which normally occur upon deformation of the material disappear and if, now, there is cooled rapidly, a record free from strain has been pressed which does not warp in the case of an unintentionally warming up, for example when the record lies in the sun. In addition, the noise level can be influenced in a favourable sense due to the substance, owing to the high temperature, having exactly filled the groove. Dissociation of the material does not take place since the high temperature is maintained for a very short time only.

According to curves II, the material is pre-heated to 145° C. and the mould is pre-heated to 190° C. Then during the relaxation, when the building up of pressure in the material is terminated, that is during the second half second after the beginning of the moulding process, the temperature of the substance momentarily increases to 155° C., but in this case also dissociation of the material does not result, since this high temperature is maintained for a short time only. When the mould is heated higher, for example to 210° C., as indicated by the curves III, and the substance is again pre-heated to 145° C., the resilient elements 3 between the press mould and the pressing block can be omitted. During the first half second, when pressure has not been built up in the material, the cooled pressing block and the press mould are lying against each other indeed, but the transfer of heat between the block and the mould is still fairly small since substantially no pressure occurs in the material. Owing to the high temperature of the mould, the temperature of the material, when the building-up of pressure in the material is terminated, is still high enough to permit substantially complete relaxation of the substance within the time available.

The said temperatures, pressures and times have been measured in pressing 7 inch, 45 revolution, records. The method may be fundamentally carried out in the same manner for larger records, but the temperatures of the press moulds are then preferably chosen a little higher and the cooling time becomes a little longer.

What is claimed is:

1. A method of moulding an object from a mass of thermoplastic synthetic material having a thickness greater than that of the object by means of a press mould adapted to be placed between two continuously-cooled pressing blocks of a press, comprising the steps of preheating the mass to a temperature at which the module of elasticity thereof is substantially zero and the viscosity thereof has a value at which substantially no pressure will be produced in the mass during the first phase of the moulding process and at a rapid rate at which substantially no dissociation thereof occurs; preheating the press mould to a temperature at least in the vicinity of the temperature of the material; placing the preheated mass in the preheated press mould; inserting the filled press mould between the pressing blocks while cooling the blocks; and closing the cooled blocks while maintaining the temperature of the material above about 145° C. until about ½ second after the material has completely filled the mould to thereby prevent the building up of any substantial pressure in the material during this period.

2. A method of moulding a disc-shaped phonograph record from a mass of a copolymer of vinyl chloride and vinyl acetate having a thickness greater than that of the record by means of a press mould adapted to be placed between two continuously-cooled pressing blocks of a press, comprising the steps of preheating the mass to a temperature at which the module of elasticity thereof is substantially zero and the viscosity thereof has a value at which substantially no pressure will be produced in the mass during the first phase of the moulding process and at a rapid rate at which substantially no dissociation thereof occurs; preheating the press mould to a temperature at least in the vicinity of the temperature of the material, placing the preheated mass in the preheated press mould; inserting the filled press mould between the pressing blocks while cooling the blocks; and closing the cooled blocks while maintaining the temperature of the material above about 145° C. until about ½ second after the material has completely filled the mould to thereby prevent the building up of any substantial pressure in the material during this period.

3. A method of moulding an object from a mass of thermoplastic synthetic material having a thickness greater than that of the object by means of a press mould adapted to be placed between two continuously-cooled pressing blocks of a press, comprising the steps of preheating the mass to a temperature at which the module of elasticity thereof is substantially zero and the viscosity thereof has a value at which substantially no pressure will be produced in the mass during the first phase of the moulding process and at a rapid rate at which substantially no dissociation thereof occurs; preheating the press mould to a temperature substantially higher than the temperature of the material; placing the preheated mass in the preheated press mould; inserting the filled press mould between the pressing blocks while cooling the blocks; and closing the cooled blocks while maintaining the temperature of the material above about 145° C. until about ½ second after the material has completely filled the mould to thereby prevent the building up of any substantial pressure in the material during this period.

4. A method of moulding a disc-shaped phonograph record from a mass of a copolymer of vinyl chloride and vinyl acetate having a thickness greater than that of the record by means of a press mould adapted to be placed between two continuously-cooled pressing blocks of a press, comprising the steps of preheating the mass to a temperature of about 165° C. and at a rapid rate at which substantially no dissociation thereof occurs, preheating the press mould to a temperature of about 145° C.; placing the preheated mass in the preheated press mould; inserting the filled press mould between the pressing blocks while cooling the blocks; and closing the cooled blocks while maintaining the temperature of the material above about 145° C. until about ½ second after the material has completely filled the mould to thereby prevent the building up of any substantial pressure in the material during this period.

5. A method of moulding a disc-shaped phonograph record from a mass of a copolymer of vinyl chloride and vinyl acetate having a thickness greater than that of the record by means of a press mould adapted to be placed between two continuously-cooled pressing blocks of a press, comprising the steps of preheating the mass to a temperature of about 145° C. at a rapid rate at which substantially no dissociation thereof occurs, preheating the press mould to a temperature of about 190° C.; inserting the filled press mould between the pressing blocks while cooling the blocks; and closing the cooled blocks while maintaining the temperature of the material above about 145° C. until about ½ second after the material has completely filled the mould to thereby prevent the building up of any substantial pressure in the material during this period.

6. A method of moulding a disc-shaped phonograph record from a mass of a copolymer of vinyl chloride and vinyl acetate having a thickness greater than that of the record by means of a press mould adapted to be placed between two continuously-cooled pressing blocks of a press, comprising the steps of preheating the mass to a temperature of about 145° C. and at a rapid rate at which substantially no dissociation thereof occurs, preheating the press mould to a temperature of about 210°; placing the preheated mass in the preheated press mould; inserting the filled press mould between the pressing blocks while cooling the blocks; and closing the cooled blocks while maintaining the temperature of the material above about 145° C. until about ½ second after the material has completely filled the mould to thereby prevent the building up of any substantial pressure in the material during this period.

References Cited in the file of this patent

UNITED STATES PATENTS

| | | |
|---|---|---|
| 1,558,175 | Jones | Oct. 20, 1925 |
| 1,735,668 | Benge et al. | Nov. 12, 1929 |
| 2,050,843 | Jacobsohn | Aug. 11, 1936 |
| 2,183,602 | Wiley | Dec. 19, 1939 |
| 2,269,267 | Hunter | Jan. 6, 1942 |

FOREIGN PATENTS

| | | |
|---|---|---|
| 820,277 | Great Britain | Sept. 16, 1959 |
| 547,291 | Italy | Aug. 20, 1956 |